Figure 1:
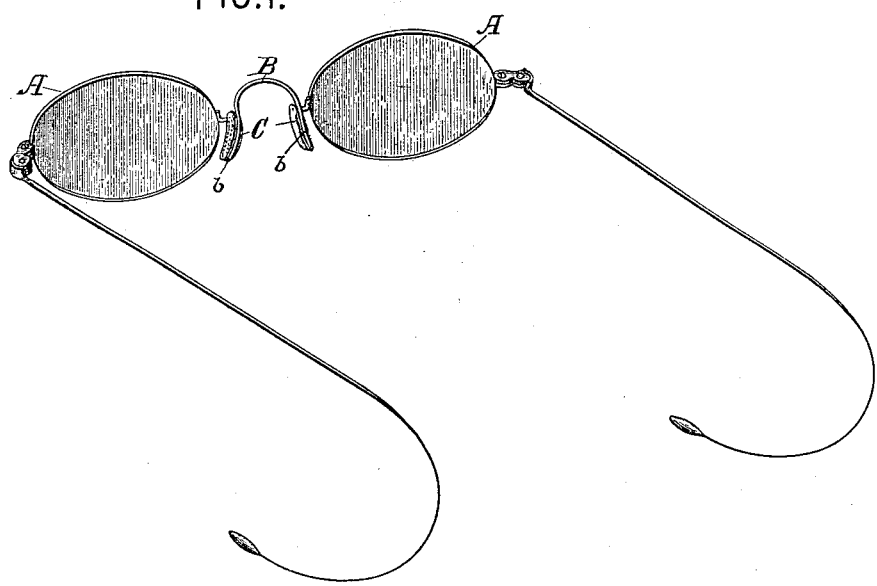

(No Model.)

J. J. FRAWLEY.
NOSE PIECE FOR SPECTACLES.

No. 350,192. Patented Oct. 5, 1886.

ATTEST.
J. Henry Kaiser
Harry L. Amer

John J. Frawley
INVENTOR
By his Attorneys
Wm. E. Strawbridge
Bonsall Taylor

UNITED STATES PATENT OFFICE.

JOHN J. FRAWLEY, OF PHILADELPHIA, PENNSYLVANIA, ASSIGNOR TO EDWARD KIRSTEIN, OF ROCHESTER, NEW YORK.

NOSE-PIECE FOR SPECTACLES.

SPECIFICATION forming part of Letters Patent No. 350,192, dated October 5, 1886.

Application filed April 21, 1886. Serial No. 199,655. (No model.)

*To all whom it may concern:*

Be it known that I, JOHN J. FRAWLEY, a citizen of the United States, residing in the city and county of Philadelphia, and State of Pennsylvania, have invented an Improvement in Spectacle-Frames, of which the following is a specification.

My invention relates particularly to that class of spectacles the bridges of which are provided with nose-pieces; and its object is the provision of an improved bridge, with which is combined, as hereinafter set forth, a pair of nose-pieces, the entire device being more comfortable to the wearer than similar contrivances in ordinary use, and yet being exceedingly simple and inexpensive in construction.

A spectacle-frame conveniently embodying my invention is represented in the drawings, and hereinafter described and claimed.

Figure 2:
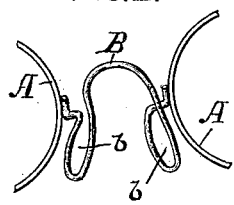

In the drawings, Figure 1 is a view in perspective of a pair of spectacles provided with my improvement, and Fig. 2 a magnified perspective detail of the bridge-piece itself.

In the drawings, A A are the lens-frames of a pair of spectacles.

B designates the bridge portion proper of my improved bridge-piece, which is formed of a continuous piece of metal of suitable diameter and character. The extremities of the bridge-piece are attached at the usual point and by any ordinary means either to the lens-frames, as shown, or to the lenses themselves.

The bridge portion proper, B, of the metal or wire is bent to form the usual inverted-U-shaped spectacle-bridge, which relatively unites the lenses and bridges the nose of the wearer. The two portions of the wire or metal forming the bridge and respectively intermediate between the bridge proper and the points of attachment to the lens-frames are each bent, folded, doubled, or otherwise shaped into loops *b*, preferably open-ended, as represented, which constitute nose-pieces or rests. These loops *b* are preferably disposed below the points of attachment of the ends of the bridge-piece B to the lens-frames or lenses, and within or nearer to the wearer's eye than said lenses, and when the spectacles are in use they lie flatwise, one upon each side of the nose of the wearer. Within each of the loops or folds *b* is fitted and clamped or retained by the tightness of its fit, or by any suitable means, a cushion, pad, or piece of cork, gutta-percha, rubber, or other suitable material, C.

My nose-pieces form an extensive bearing, through which the spectacles rest upon the nose, serve to raise the bridge proper from the nose, and thereby avoid a disfiguring ridge across the nose, and distribute the weight of the spectacles over a larger surface, thereby increasing the comfort of the wearer. The loops may be formed of any size, being pliable, may be readily bent and adjusted, and may be completely closed instead of being open, as represented. The cork also may, if desired, be omitted, although I prefer to employ it.

I do not claim, broadly, providing a spectacle-frame with nose-pieces, nor yet the application of a pad or cushion of cork or other material to a nose-piece; but the gist of my invention resides in constructing a bridge-piece of a single continuous piece of metal, so bent or formed as to present two loops or folds, constituting nose-pieces adapted to lie upon each side of the nose of the wearer, and, further, in placing within each of said folds or loops a piece of cork or other suitable material.

It is evident that the specific form represented is not the only but simply a convenient embodiment of my invention, and that my invention could be carried into effect, for instance, by attaching the intermediate portions of the bridge-piece directly to the lens-frame and then carrying the extremities down and forming them into loops. The contrivance is also applicable to eyeglasses which are not intended to be folded together.

Having thus described my invention, I claim—

1. A spectacle nose-bridge formed or provided with loops or folds, one of which is adapted to lie flatwise upon each side of the nose of the wearer, and within each of which folds is secured a cushion of rubber, cork, or other material, substantially as described.

2. A spectacle nose-bridge formed of a continuous piece of metal and bent or otherwise shaped to form loops or folds below its points of attachment to the lenses or lens-frames, and within each of which folds is secured a cushion of cork or other material, substantially as described.

3. A spectacle nose-bridge formed of a continuous piece of metal and bent or otherwise shaped to form loops or folds below its points of attachment to the lenses or lens-frames, which loops or folds lie in planes approximately right-angular to the plane of the lenses, and within each of which folds is secured a cushion of cork or other material, substantially as described.

4. A spectacle nose-bridge parts of which respectively intermediate between its central portion and its extremities are folded, bent, or otherwise shaped to form bearings or rests adapted to lie one upon each side of the nose of the wearer, and within each of which rests is secured a cushion of cork or other material, substantially as described.

In testimony whereof I have hereunto signed my name this 31st day of March, A. D. 1886.

JOHN J. FRAWLEY.

In presence of—
 WM. C. STRAWBRIDGE,
 J. BONSALL TAYLOR.